June 7, 1927.
T. A. BUCKLEY
1,631,791
GUM MASSAGING AND CLEANSING DEVICE
Filed Aug. 17, 1925
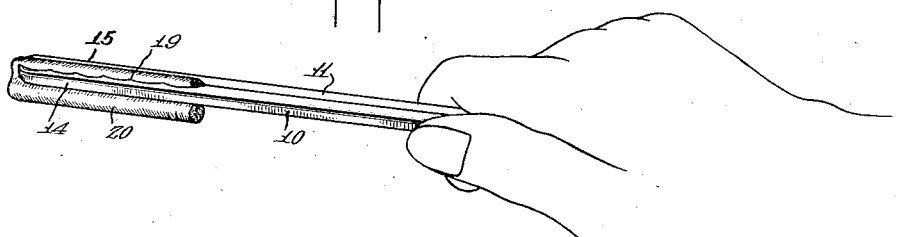
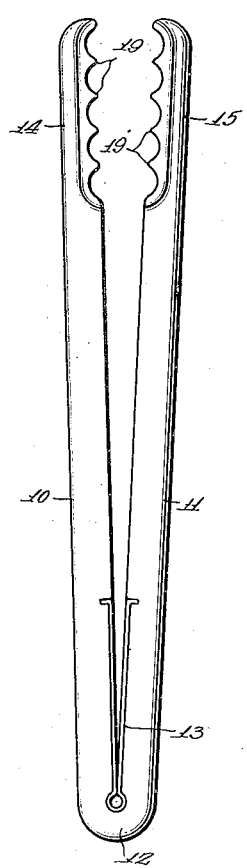
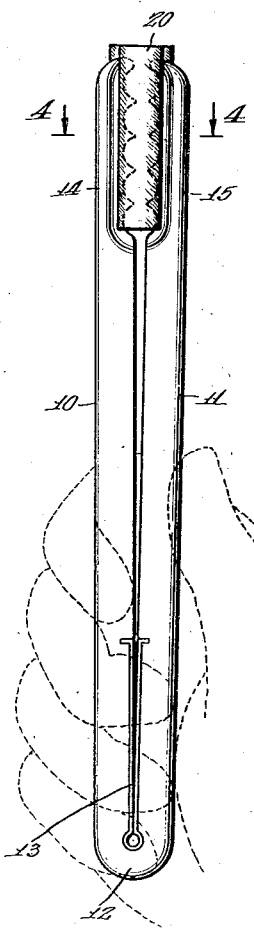
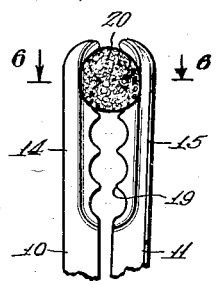
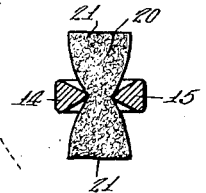
INVENTOR
Thomas H. Buckley,
BY
ATTORNEYS
WITNESSES Patented June 7, 1927.

1,631,791

UNITED STATES PATENT OFFICE.

THOMAS A. BUCKLEY, OF BROOKLYN, NEW YORK.

GUM MASSAGING AND CLEANSING DEVICE.

Application filed August 17, 1925. Serial No. 50,770.

This invention pertains to dental implements and has particular reference to a gum massaging and cleansing device.

The invention contemplates a gripping and holding implement in the nature of a pair of tongs provided with means at the free extremities for effectively gripping and holding a cotton roll either in longitudinal or transverse relation with respect thereto for the purpose specified.

The invention furthermore aims to provide in a gum massaging and cleansing device, a gripping and holding implement which is comparatively simple in its construction and mode of use, which is inexpensive to manufacture, and which is highly efficient in its purpose.

With the above recited and other objects in view, reference is had to the following specification and accompanying drawings in which there is exhibited one example or embodiment of the invention which is in no way intended as a limitation upon the scope of the appended claim as it is to be clearly understood that variations and modifications which properly fall within the scope of said claim may be resorted to when found expedient.

In the drawings—

Figure 1 is a perspective view illustrating the manner in which the implement grips and holds a cotton roll in longitudinal relation;

Fig. 2 is a side view of the implement in open non-gripping and holding condition;

Fig. 3 is a similar view illustrating a cotton roll gripped and held by the implement;

Fig. 4 is a transverse sectional view taken approximately on the line 4—4 of Fig. 3;

Fig. 5 is a fragmentary side view illustrating the manner in which the cotton roll section is gripped and held in transverse relation to the implement;

Fig. 6 is a sectional view therethrough taken approximately on the line 6—6 of Fig. 5.

Referring to the drawings by characters of reference, the implement which is in the nature of a pair of tongs, includes side legs 10 and 11 constructed from a resilient material and connected at one end by a bight 12. Means in the nature of a leaf spring 13, is connected to the legs 10 and 11 adjacent the bight 12, for normally effecting a relative separation of the free ends of the legs with respect to each other. The free ends of the legs 10 and 11 are formed to provide gripping jaws 14 and 15, each of which is beveled inwardly on its opposite faces 16 and 17 so that said beveled or convergent faces provide a relatively narrow inner edge 18, which is cut out to form gripping teeth 19. An ordinary form of cotton roll 20 is gripped between the jaws 14 and 15 by the teeth 19, so as to provide when associated in the manner illustrated in Figs. 1 to 4, a longitudinally extending massaging and cleansing device for the gums.

In some instances, however, it is desirable as illustrated in Figs. 5 and 6, to arrange a short section of roll cotton 20 transversely to the length of the implement, in which case the said section is gripped in the manner illustrated in said figures, between the jaws 14 and 15, by the teeth 19. In this instance, the ends 21 of the roll are employed for the cleansing or massaging operation.

When the massaging or cleansing operation is completed in either instance, the user by releasing his grasp upon the arms 10 and 11, permits the spring 13 to separate the gripping jaws for removing the cotton roll.

What is claimed is:

A device of the class described consisting of a length of resilient material formed to provide a pair of side arms having a connecting bight at one end integral therewith, an element within the bight and connected within the bight and side arms and connected thereto for normally effecting relative separation of the opposite free ends, the said opposite free ends having inwardly converging faces presenting relatively narrow inner edges, the said edges formed with a series of longitudinally spaced arcuate cut-away portions defining gripping teeth between which the article to be supported is adapted to be gripped by inward swinging movement of the side arms.

THOMAS A. BUCKLEY.